United States Patent
Merchant et al.

(10) Patent No.: US 11,022,038 B2
(45) Date of Patent: Jun. 1, 2021

(54) COMPRESSOR CIRCUMFERENTIAL FLUID DISTRIBUTION SYSTEM

(71) Applicant: General Electric Company, Schenectady, NY (US)

(72) Inventors: Laxmikant Merchant, Bangalore (IN); Hua Zhang, Greer, SC (US); Joseph Anthony Cotroneo, Clifton Park, NY (US); Francesco Soranna, Fort Mill, SC (US)

(73) Assignee: General Electric Company, Schenectady, NY (US)

( * ) Notice: Subject to any disclaimer, the term of this patent is extended or adjusted under 35 U.S.C. 154(b) by 415 days.

(21) Appl. No.: 15/586,640

(22) Filed: May 4, 2017

(65) Prior Publication Data

US 2018/0320594 A1 Nov. 8, 2018

(51) Int. Cl.
*F02C 7/143* (2006.01)
*F04D 29/70* (2006.01)
(Continued)

(52) U.S. Cl.
CPC .......... *F02C 7/1435* (2013.01); *F01D 25/002* (2013.01); *F02C 7/04* (2013.01);
(Continued)

(58) Field of Classification Search
CPC .... F01D 25/002; F02C 7/1435; F04D 29/705; F05D 2260/212
(Continued)

(56) References Cited

U.S. PATENT DOCUMENTS 5,273,395 A * 12/1993 McDermott .............. B08B 3/02
134/199
6,553,768 B1 * 4/2003 Trewin .................. B05B 7/0441
134/198
(Continued)

FOREIGN PATENT DOCUMENTS

EP    1 205 640 A2    5/2002
EP    1 749 976 A2    2/2007
(Continued)

OTHER PUBLICATIONS

Extended European Search Report and Opinion issued in connection with corresponding EP Application No. 18170076.6 dated Sep. 28, 2018, 7 pgs.
(Continued)

*Primary Examiner* — Brian P Wolcott
*Assistant Examiner* — Aye S Htay
(74) *Attorney, Agent, or Firm* — Fletcher Yoder, P.C.

(57) ABSTRACT

A system includes a fluid distribution system. The fluid distribution system includes multiple spray rings disposed upstream of an inlet of a compressor. The multiple spray rings include a first spray ring disposed about an axis of the compressor in a first plane substantially perpendicular to the axis. The first spray ring includes a first set of nozzles disposed about the axis and configured to spray a first fluid flow toward the compressor inlet. The multiple spray rings further include a second spray ring disposed about the axis of the compressor in a second plane substantially perpendicular to the axis. The second spray ring includes a second set of nozzles disposed about the axis and configured to spray a second fluid flow toward the compressor inlet. The first plane is different than the second plane.

21 Claims, 5 Drawing Sheets

(51) Int. Cl.
*F02C 7/04* (2006.01)
*F01D 25/00* (2006.01)

(52) U.S. Cl.
CPC ...... *F04D 29/705* (2013.01); *F05D 2250/311* (2013.01); *F05D 2250/36* (2013.01); *F05D 2260/212* (2013.01)

(58) Field of Classification Search
USPC ....................................................... 415/121.2
See application file for complete search history.

(56) References Cited

U.S. PATENT DOCUMENTS

| | | | |
|---|---|---|---|
| 7,520,137 B2 | 4/2009 | Hoffmann et al. | |
| 2007/0000528 A1* | 1/2007 | Asplund | B08B 3/02 134/166 R |
| 2007/0028947 A1* | 2/2007 | Erickson | F01D 25/002 134/22.18 |
| 2007/0059159 A1* | 3/2007 | Hjerpe | B08B 3/02 415/117 |
| 2009/0039182 A1* | 2/2009 | Tassone | F01D 25/002 239/600 |
| 2009/0145100 A1 | 6/2009 | Omielan et al. | |
| 2009/0320440 A1* | 12/2009 | Erickson | F02C 7/1435 60/39.53 |
| 2010/0206966 A1* | 8/2010 | McDermott | B05B 1/14 239/590 |
| 2010/0263541 A1* | 10/2010 | Kippel | B01D 46/0082 96/233 |
| 2011/0197923 A1* | 8/2011 | Battaglioli | B08B 3/02 134/18 |
| 2013/0152592 A1* | 6/2013 | Orosa | F01D 25/305 60/772 |
| 2015/0000693 A1* | 1/2015 | Byrd | F01D 25/002 134/1 |
| 2015/0122292 A1* | 5/2015 | McDermott | F01D 25/002 134/18 |
| 2015/0377133 A1 | 12/2015 | Kanebako | |

FOREIGN PATENT DOCUMENTS

| | | |
|---|---|---|
| EP | 2 980 384 A1 | 2/2016 |
| JP | 2000-352320 A | 12/2000 |

OTHER PUBLICATIONS

Chinese Office Action for CN Application No. 201810420115.4 dated Jul. 1, 2020; 19 pgs.

* cited by examiner

COMPRESSOR CIRCUMFERENTIAL FLUID DISTRIBUTION SYSTEM

BACKGROUND

The subject matter disclosed herein relates to gas turbine systems, and more specifically, to a circumferential fluid distribution system for a compressor of a gas turbine system.

Gas turbine systems typically include a gas turbine engine having a compressor, a combustor, and a turbine. Air may be compressed in the compressor and combined with fuel to create a fuel-air mixture. The fuel-air mixture may be fed into the combustor, where the air-fuel mixture may be combusted to produce hot pressurized exhaust gas. The pressurized exhaust gas may be passed through the turbine causing the turbine blades to rotate, thus generating an output of the gas turbine system. Injection of a fluid into the intake of air at the compressor inlet may increase the efficiency and output of the gas turbine system by cooling the air within the compressor and removing impurities from the compressor blades.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, system includes a fluid distribution system. The fluid distribution system includes multiple spray rings disposed upstream of an inlet of a compressor. The multiple spray rings include a first spray ring disposed about an axis of the compressor in a first plane substantially perpendicular to the axis. The first spray ring includes a first set of nozzles disposed about the axis and configured to spray a first fluid flow toward the compressor inlet. The multiple spray rings further include a second spray ring disposed about the axis of the compressor in a second plane substantially perpendicular to the axis. The second spray ring includes a second set of nozzles disposed about the axis and configured to spray a second fluid flow toward the compressor inlet. The first plane is different than the second plane.

In a second embodiment, a system includes a water distribution system. The water distribution system includes multiple spray rings disposed upstream of an inlet of a compressor. The multiple spray rings include a first spray ring disposed a first radial distance about an axis of the compressor in a first plane substantially perpendicular to the axis. The first spray ring includes a first set of wet compression nozzles disposed about the axis and configured to spray a first water flow toward the compressor inlet. The multiple spray rings further include a second spray ring disposed a second radial distance about the axis of the compressor in a second plane substantially perpendicular to the axis. The second spray ring includes a second set of nozzles disposed about the axis and configured to spray a second water flow toward the compressor inlet. The first plane is different than the second plane, and the first radial distance is greater than the second radial distance.

In a third embodiment, a system includes a water distribution system. The water distribution system includes multiple spray rings disposed upstream of an inlet of a compressor. The multiple spray rings include a first spray ring disposed about an axis of the compressor in a first plane substantially perpendicular to the axis. The first spray ring includes a first fluid conduit configured to receive a first water flow and a first set of wet compression nozzles disposed about the axis. The first of wet compression nozzles is coupled to the first fluid conduit and is configured to spray the first water flow toward the compressor inlet. The first spray ring further includes a second fluid conduit configured to receive a second water flow and a second set of water wash nozzles disposed about the axis. The second set of water wash nozzles is coupled to the second fluid conduit and is configured to spray the second water flow toward the compressor inlet. The multiple spray rings further includes a second spray ring disposed about the axis of the compressor in a second plane substantially perpendicular to the axis. The second spray ring includes a third set of nozzles disposed about the axis and configured to spray a third water flow toward the compressor inlet. The first plane is different than the second plane.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed above, the output of a gas turbine system may be the rotation of the turbine blades, and in turn the rotation of the shaft of the turbine. The turbine blades may rotate when hot pressurized exhaust gas is passed through the turbine from the combustor. The combustor may combust a fuel-air mixture to create the hot pressurized exhaust gas. Fuel for the fuel-air mixture may be injected into the combustor through fuel nozzles, where it may mix with compressed air from the compressor. The compressor may receive air from an air intake and compress the air through a series of compressor blades. The output and efficiency of the gas turbine system may be increased through injection of a fluid into the air that is fed into the compressor by cooling the air through evaporation and by cleaning the blades within the compressor.

With the foregoing in mind, the disclosed embodiments may include a fluid distribution system. Specifically, the fluid distribution system may be utilized for wet compression, online water wash procedures, or both within the compressor of the gas turbine system. The fluid distribution system may include a number of axially staggered circumferential spray rings that may be positioned near the inlet of the compressor and configured to spray fluid droplets into the air as it enters the compressor. The axially staggered arrangement of the spray rings described herein may disrupt the flow of air into the compressor less than a fluid distribution system arranged in a plane across an air intake. The axially staggered arrangement and the circumferential configuration of the spray rings may reduce thermal gradients inside the compressor caused by evaporation of fluid during compression of the flow of air. Additionally, or in the alternative, the axially staggered arrangement and circumferential configuration of the spray rings may enable greater coverage of the compressor blades by the fluid spray. Further, some spray rings may be configured to include nozzles for both wet compression and water wash, which may be supplied separately through the same fluid supply system.

Figure 1:
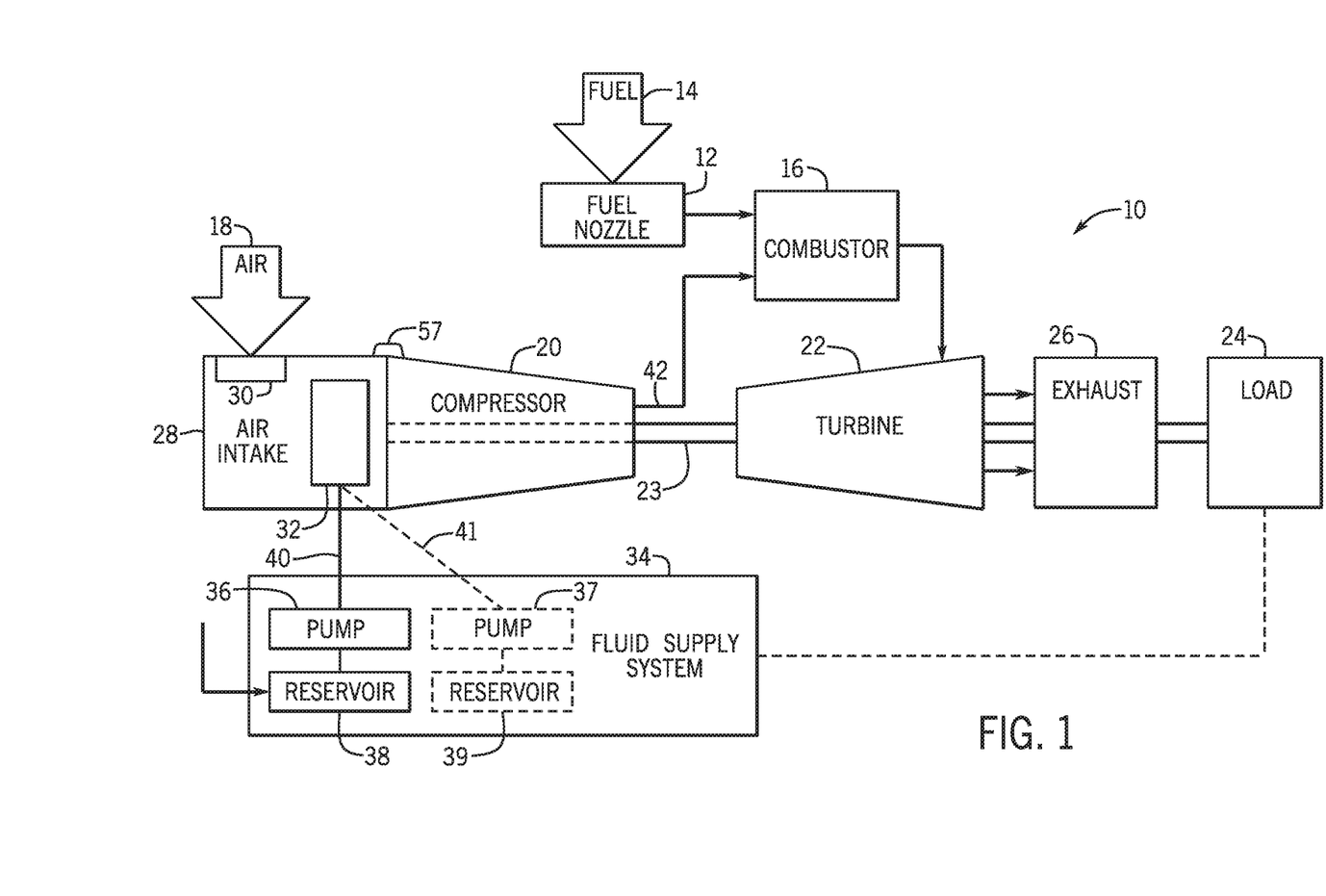
FIG. 1 is a block diagram of an embodiment of a gas turbine system having a fluid distribution system, in accordance with embodiments of the present disclosure.

Turning now to the drawings and referring first to FIG. 1, a block diagram of a gas turbine system 10 is illustrated. The diagram includes fuel nozzles 12, fuel 14, and combustor 16. As depicted, fuel 14 (e.g., a liquid fuel, a gas fuel), such as natural gas, is routed to the gas turbine system 10 through fuel nozzles 12 into combustor 16. The fuel 14 combines with compressed air 42 from a compressor 20 (e.g., axial compressor with a plurality of stages). The compressor 20 produces the compressed air 42 from an intake air flow 18 that is compressed in the compressor 20. The combustor 16 ignites and combusts the air-fuel mixture, and then directs hot pressurized exhaust gas into a turbine 22. The exhaust gas passes through blades of the turbine 22 causing the turbine shaft 23 to rotate, thus creating the power output of the gas turbine system 10. The turbine shaft 23 may be coupled directly or indirectly to one or more components (e.g., compressor 20, load 24, fluid supply system 34) throughout the gas turbine system 10. Eventually, the exhaust gases of the combustion process may exit the gas turbine system 10 via an exhaust outlet 26.

The intake air flow 18 may enter the compressor 20 through an air intake 28 upstream of the compressor 20. The air intake 28 may include a filter 30 that processes (e.g., filters) the intake air flow 18. A fluid distribution system 32 may be located within the air intake 28 upstream of the inlet 57 of the compressor 20. The fluid distribution system 32 is configured to inject a fluid, such as water, into the intake air flow 18 as it enters the compressor 20. Fluid may be supplied to the fluid distribution system 32 by a fluid supply system 34. The fluid supply system 34 may include a pump 36 and a reservoir 38. The fluid may be pumped from the reservoir 38 by the pump 36, and supplied to the fluid distribution system 32 via a fluid supply line 40. In some embodiments, the fluid distribution system 32 may include a second pump 37 coupled to a second reservoir 39 that may supply fluid via a second fluid supply line 41, such that each pump 36, 37 and reservoir 38, 39 may supply fluid to the fluid distribution system 32 for either wet compression procedures or water wash procedure. However, there may be any quantity of pumps (e.g., 1, 2, 3, 4, or more) and there may be any number of reservoirs (e.g., 1, 2, 3, 4, or more) to supply fluid to the fluid distribution system 32. The fluid supplied to the fluid distribution system 32 may be any fluid desired to be injected into the intake air flow 18 at the entrance to the compressor 20, such as water, water with added detergent, or any other fluid.

In some embodiments, the fluid distribution system 32 may be utilized to inject relatively small droplets of the fluid into the intake air flow 18 during operation of the compressor 20 in a wet compression mode. The relatively small droplets (e.g., 10-60 microns) of the fluid from the fluid distribution system 32 may be carried by the intake air flow 18 into the compressor 20. Within the compressor 20, the fluid may evaporate, thus cooling the intake air flow 18, enabling the intake air flow 18 to be compressed using less work by the compressor 20 during operation in the wet compression mode. In some embodiments, the fluid distribution system 32 may be utilized to inject larger droplets (e.g., 80 to 120 microns or more) of the fluid into the intake air flow 18 during operation of the compressor 20 in a water wash mode. The larger size droplets of the fluid from the fluid distribution system 32 may be carried by the intake air flow 18 into the compressor 20 during operation in the water wash mode. The larger size droplets may contact the blades of the compressor 20, thus cleaning and removing impurities from the blades.

Figure 2:
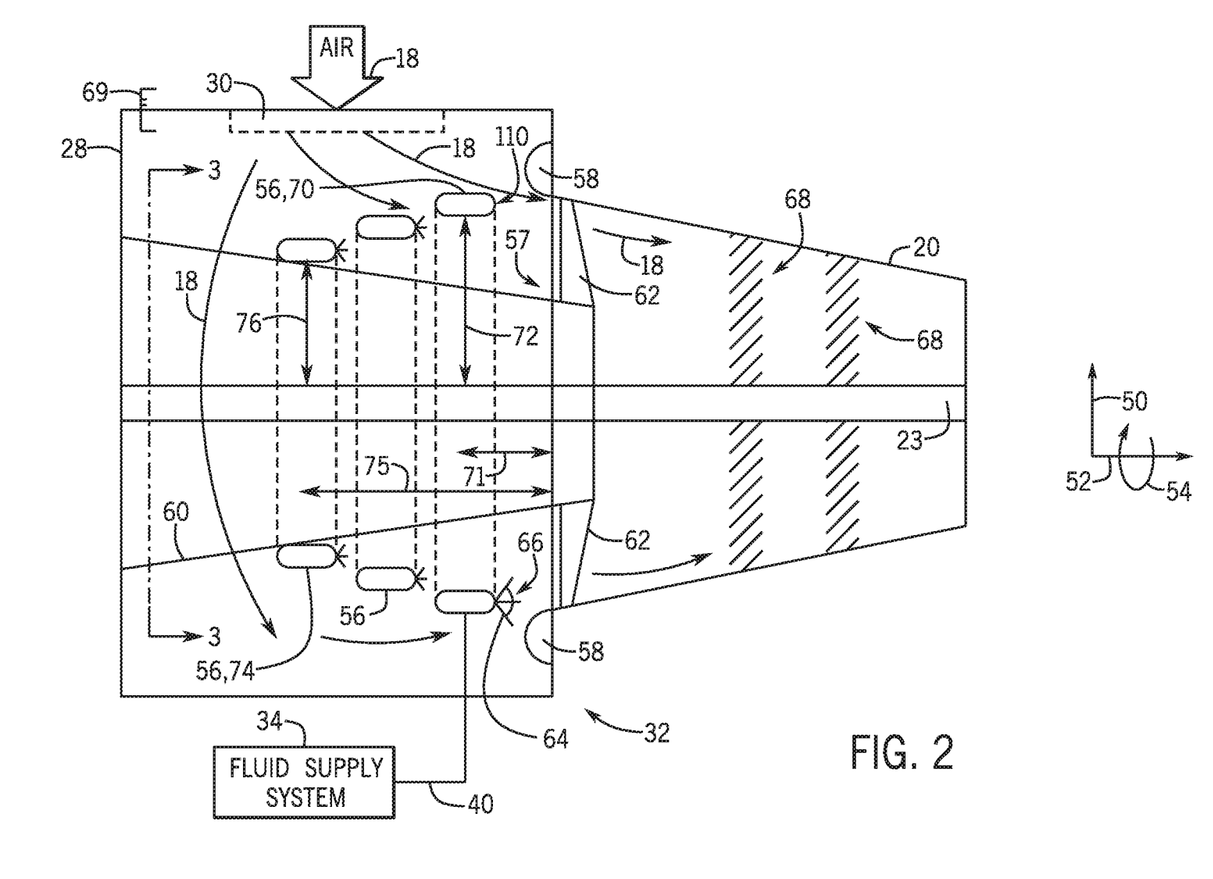
FIG. 2 is a cross section view of an embodiment of the fluid distribution system of FIG. 1, in accordance with an embodiment of the present disclosure.

FIG. 2 is a cross section view of an embodiment of the fluid distribution system 32 within the air intake 28. The fluid distribution system 32 may be positioned within the air intake 28 adjacent to and upstream of the compressor 20. To facilitate discussion, the fluid distribution system 32 and its components may be described with reference to a radial axis or direction 50, an axial axis or direction 52, and a circumferential axis or direction 54. The fluid distribution system 32 may include multiple spray rings 56 configured to distribute the supplied fluid from the fluid supply system 34 towards an inlet 57. A bell mouth 58 of the compressor 20 extends into the air intake 28 and defines the inlet 57 of the compressor 20. As described herein, the inlet 57 receives the intake air flow 18 and the sprayed fluid from the spray rings 56.

The multiple spray rings 56 may be circumferentially 54 disposed around a shroud 60, the shaft 23, or the axis 52 of the compressor 20, or any combination thereof. In some embodiments, the structure of the spray rings 56 may facilitate mixing of the intake air flow 18 with the sprayed fluid from the spray rings 56 as it enters the compressor 20. As discussed in detail below, the spray rings 56 may have an airfoil shape configured to reduce pressure effects on the intake air flow 18 that flows across the spray rings 56. In some embodiments, the shroud 60 may extend at least partially into the compressor 20. The compressor 20 and the shroud 60 may be connected by multiple struts 62 near the inlet to the compressor 20. In some embodiments, the shaft 23 extends through the middle of the compressor 20, the shroud 60, and the multiple spray rings 56.

In the illustrated embodiment, there are three spray rings 56 near the bell mouth 58 of the inlet of the compressor 20. However, the fluid distribution system 32 may include any quantity (e.g., 2, 3, 4, 5, 6, 7, or more) of spray rings 56. The multiple spray rings 56 may be disposed circumferentially 54 about the axis 52 of the compressor 20. However, the spray rings 56 may be disposed about an axis different than the axis 52 of the compressor 20. Further, the spray rings 56 are illustrated as having a circular shape, however, in some embodiments, the spray rings 56 may be elliptical (e.g., curved but not circular), or may be polygonal (e.g., straight edges). The spray rings 56 may be positioned upstream of or within the bell mouth 58 of the inlet 57 to the compressor 20. The multiple spray rings 56 may be axially staggered such that the spray rings 56 are positioned in a series in at least two different planes that are substantially perpendicular (e.g., within 10°) to the axis 52 of the compressor 20. For example, a first spray ring 70 may be disposed a first axial distance 71 from the inlet 57 of the compressor 20, and a second spray ring 74 may be disposed a second axial distance 75 from the inlet 57. The first axial distance 71 of the first spray ring 70, which is disposed nearer to the inlet 57 of the compressor 20 than the second spray ring 74, may be smaller than the second axial distance 75 of the second spray ring 74. Further, the spray rings 56 of the fluid distribution system 32 may be continuous rings, or in some embodiments, the spray rings 56 may be split into sections (e.g., sections of 180°, 120°, 90°), either individually or as a group, as discussed in greater detail with reference to FIG. 3.

In some embodiments, each spray ring 56 may be a different size. That is, each spray ring 56 may have a different diameter or radial distance from the axis 52 of the compressor. The axially staggered positions and sizes (e.g., diameters) of the respective spray rings may help reduce interference of the flow of fluid droplets sprayed by the spray rings 56 toward the inlet 57. The axially staggered spray rings 56 may be positioned, relative to each other, with the largest spray ring 56 closest to the inlet 57 of the compressor 20 and the smallest spray ring 56 farthest from the inlet 57 of the compressor 20, as in the illustrated embodiment. For example, the first spray ring 70 may be disposed a first radial distance 72 from the axis 52 of the compressor 20, and the second spray ring 74 may be disposed a second radial distance 76 from the axis 52. The first radial distance 72 of the first spray ring 70, which is disposed nearer to the inlet 57 than the second spray ring 74, may be larger than the second radial distance 76 of the second spray ring 74. However, in some embodiments, the spray rings 56 may be positioned such that the smallest spray ring 56 is closest to the inlet 57 of the compressor 20 and the largest spray ring 56 is farthest from the inlet 57 of the compressor 20.

The multiple spray rings 56 may each have multiple nozzles configured to spray the supplied fluid into the intake air flow 18 to be carried into the compressor 20. In some embodiments, the multiple nozzles may be disposed along the trailing edge or pointed towards the trailing edge 110 (e.g., downstream side) of the spray rings 56. However, the nozzles may be disposed on any surface of the spray ring 56. The multiple nozzles may be mounted on the surface of the spray rings 56, or the nozzles may be disposed fully within the structure of the spray rings 56 such that the nozzles do not protrude from the surface of the spray rings 56. The nozzle may produce a spray of fluid 64 that may be sprayed towards the inlet 57 of the compressor 20. In some embodiments, the spray 64 from each nozzle may have a width 66 that may be varied. The width 66 of the spray 64 may be varied based at least in part on the type of nozzle, the pressure of the fluid supplied to the nozzle, the flow rate of the fluid supplied to the nozzle, or any combination thereof. The nozzles may be water wash nozzles or wet compression nozzles, as discussed in greater detail with reference to FIG. 3. In some embodiments, there may be nozzles of each type on each spray ring 56. That is, each spray ring 56 may have wet compression nozzles and water wash nozzles. However, some spray rings 56 may have all wet compression nozzles, and some spray rings 56 may have all water wash nozzles. The width 66 of the spray 64 may vary between water wash nozzles, wet compression nozzles, and a mixture of both types of nozzles.

In some embodiments, as the intake air flow 18 enters the air intake 28, it may flow around the shroud 60 and through the spaces between the staggered spray rings 56. The fluid spray may mix with the intake air flow 18 and may be carried in the axial direction 52 past the bell mouth 58 and into the compressor 20. During operation of the compressor 20 in a wet compression mode, the relatively small droplets from the fluid spray may evaporate and cool the intake air flow 18 as it passes through the compressor 20. During operation of the compressor 20 in a water wash mode, the relatively large droplets from the fluid spray may interface with the blades 68 of the compressor 20. The fluid spray 64 may contain droplets of different sizes. The droplets of the fluid spray 64 from the wet compression nozzles may be relatively smaller in size (e.g., 10-60 microns) compared to the size of the droplets from the water wash nozzles (e.g., 80 to 120 or more microns). However, droplets from both the wet compression nozzles and the water wash nozzles may have some variation in droplet size. Fluid droplets sprayed into the intake air flow 18 at a top portion 69 of the air intake 28 may be susceptible to gravitational and centrifugal forces that may cause larger size fluid droplets to migrate toward the shroud 60 and toward the periphery of the compressor 20. These forces on the fluid droplets received through the top portion 69 may cause thermal gradients in the radial 50 direction and circumferential direction 50 within the compressor 20 as the fluid droplets evaporate. These gravitational and centrifugal forces on the larger fluid droplets received into the air intake 28 at the top portion 69 may cause the blades 68 of the compressor to be washed ineffectively due to biased droplet distribution. However, the staggered and circumferential arrangement of the spray rings 56 described herein may enable a mitigation of the effects of the gravitational or centrifugal forces acting on the fluid droplets from the wet compression nozzles and the water wash nozzles, thus enabling an increase in efficiency and output of the gas turbine system 10. That is, the arrangement of the spray rings 56 in the air intake 28, axially upstream of the inlet 57, and circumferentially around the axis 52 may reduce or eliminate the effects of the gravitational and centrifugal forces acting on the fluid droplets from the wet compression nozzles and the water wash nozzles.

Figure 3:
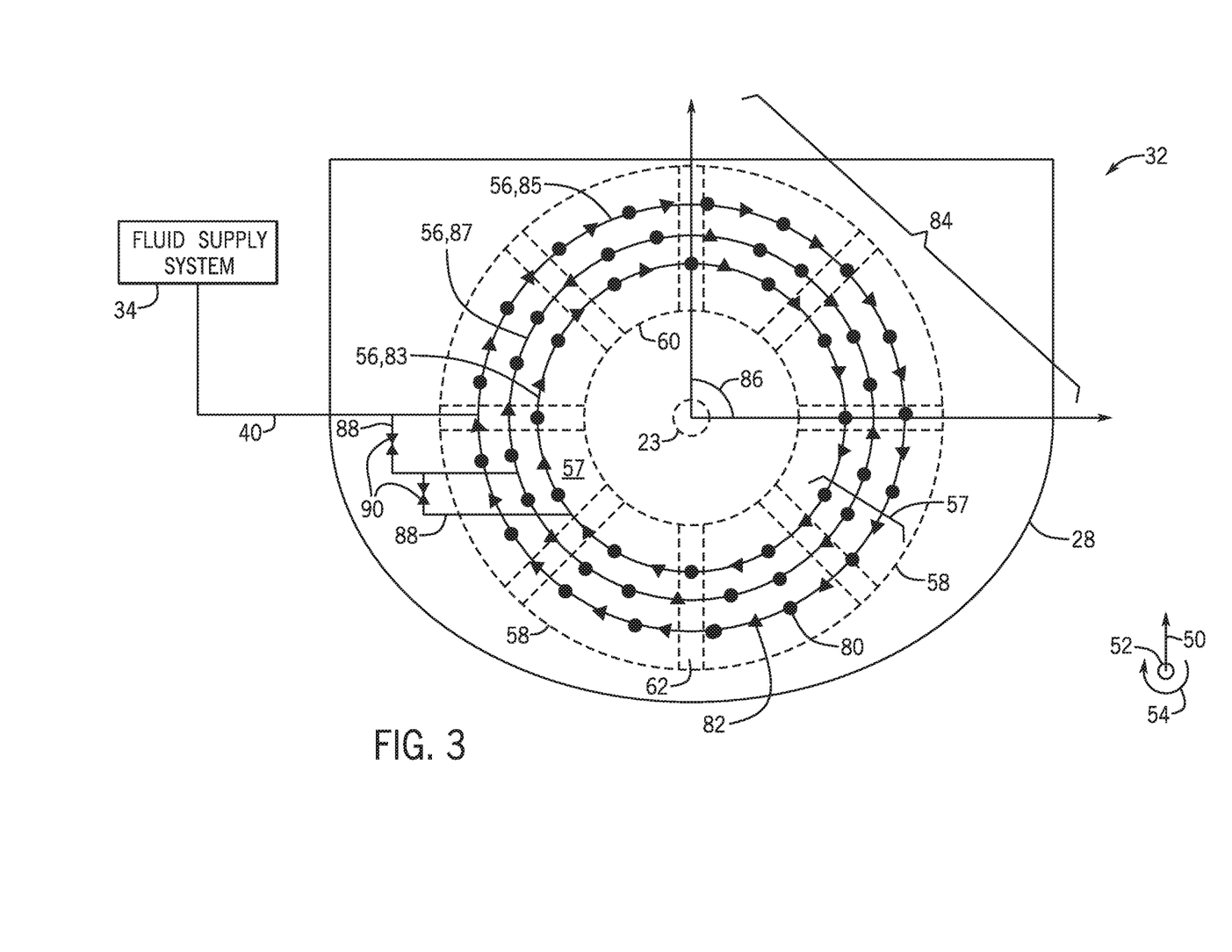
FIG. 3 is an axial cross-section view of an embodiment of the fluid distribution system of FIG. 2 taken along line 3-3, in accordance with an embodiment of the present disclosure.

FIG. 3 is an axial cross-section view of an embodiment of the fluid distribution system 32 of FIG. 2 taken along line 3-3. In the illustrated embodiment, shown are three staggered spray rings 56 of the fluid distribution system 32 as viewed from inside the air intake 28 looking into the inlet 57 of the compressor 20. As previously discussed, the fluid distribution system 32 may include any quantity of the spray rings 56. For reference, the struts 62 are illustrated. The struts 62 may couple to the bell mouth 58 of the compressor 20 and to the shroud 60. As previously discussed, the spray rings 56 may be disposed within the air intake 28 upstream of or within the bell mouth 58 and inlet 57 of the compressor 20. The spray rings 56 may be circumferentially 54 disposed about the axis 52 of the compressor 20. In some embodiments, one or more of the spray rings 56 is disposed about the shroud 60. As previously discussed, the spray rings 56 may be disposed at different radial distances from the axis 52 than one another, and the spray rings 56 may be disposed in different axial planes than one another. For example, the smallest diameter spray ring 56 may be farthest from the inlet 57 of the compressor 20 and the largest diameter spray ring 56 may be closest to the inlet 57 of the compressor 20. However, the different size spray rings 56 may be disposed in the inverse arrangement such that the smallest diameter spray ring 56 is closest to the inlet 57 of the compressor 20 and the largest diameter spray ring 56 is farthest from the inlet 57 of the compressor 20. Further, the spray rings 56 of the fluid distribution system 32 may be continuous rings, or in some embodiments, the spray rings 56 may be split into sections (e.g., sections of 180°, 120°, 90°), either individually or as a group, as discussed in greater detail below.

Each spray ring 56 of the fluid distribution system 32 may have any quantity of nozzles (e.g., 2, 3, 4, 5, 6, 7, 8, 9, 10, or more). The spray rings 56 may each have the same quantity of nozzles, or the spray rings 56 may each have a different quantity of nozzles. The nozzles may each be a wet compression nozzle 80 or a water wash nozzle 82. The wet compression nozzles 80 of the fluid distribution system 32 may form a respective wet compression nozzle grid. The water wash nozzles 82 of the fluid distribution system 32 may form a respective water wash nozzle grid. Each nozzle may have an outlet for the supplied fluid to exit the spray rings 56. The outlets of the wet compression nozzles 80 may be smaller than the outlets of the water wash nozzles 82, thus enabling smaller fluid droplet sizes from the wet compression nozzles 80 compared to water wash nozzles 82. Different fluid droplet sizes may be utilized for different processes within the compressor 20, such as wet compression or online water wash. Further, because the outlet sizes of the wet compression nozzles 80 and water wash nozzles 82 may be different, the fluid pressure at each type of nozzle may vary. For example, the wet compression nozzles 80 may be supplied with fluid at approximately 5516 to 15,168 kPa (800 to 2,200 psi). The water wash nozzles 82 may be supplied with fluid at approximately 552 to 1,379 kPa (80 to 200 psi). The wet compression nozzles 80 and the water wash nozzles 82 may be utilized separately for separate procedures within the compressor 20. However, in some embodiments, the wet compression nozzles 80 and the water wash nozzles 82 may be utilized together simultaneously.

In the illustrated embodiment, each spray ring 56 may include both the wet compression nozzles 80 and the water wash nozzles 82. However, in some embodiments, one or more spray rings 56 may include only one type of nozzles (e.g., all wet compression nozzles 80, all water wash nozzles 82). In some embodiments, if both the wet compression nozzles 80 and the water wash nozzles 82 are included in one or more of the spray rings 56, the nozzle types may be in any pattern or order. For example, in the illustrated embodiment, a first spray ring 83 and a second spray ring 85 include both the wet compression nozzles 80 and the water wash nozzles 82 in a repeating pattern of one wet compression nozzle 80 followed by one water wash nozzle 82 disposed on the spray rings 56 circumferentially about the axis 52. However, in the illustrated embodiment, the third spray ring 87 includes both the wet compression nozzles 80 and the water wash nozzles 82 in a repeating pattern of two wet compression nozzles 80 followed by one water wash nozzle 82. The spray rings 56 having both types of nozzles may include any quantity (e.g., 1, 2, 3, 4, 5, or more) of the wet compression nozzles 80 and any quantity (e.g., 1, 2, 3, 4, 5, or more) of the water wash nozzles 82. Further, in some embodiments, the quantity of the wet compression nozzles 80 and the quantity of the water wash nozzles 82 may be equal on one or more spray rings 56.

The position of the wet compression nozzles 80 about the spray rings 56 may enable a uniform or a non-uniform distribution of the wet compression nozzles 80 about the axis 52. This in turn may enable a non-uniform distribution of the fluid spray from the wet compression nozzles 80 between an inner diameter of the compressor 20 and an outer diameter of the compressor 20. In some embodiments, there may be a greater distribution of the fluid spray from the wet compression nozzles 80 toward the inner diameter of the compressor 20 than the outer diameter. A greater distribution of the fluid spray from the wet compression nozzles 80 toward the inner diameter of the compressor 20 may enable a mitigation of the effects of the gravitational or centrifugal forces acting on the fluid droplets from the wet compression nozzles 80 and may enable a more uniform distribution of the fluid droplets from the wet compression nozzles 80 downstream within the compressor 20. Additionally or alternatively, a greater distribution of the fluid spray from the wet compression nozzles 80 toward the inner diameter of the compressor 20 may be achieved through the flow rate of the fluid through the fluid distribution system 32, the angle of the spray of the fluid from the wet compression nozzles 80, or a combination thereof.

The wet compression nozzles 80 and the water wash nozzles 82 of the spray rings 56 may be supplied with the fluid by the fluid supply system 34. The fluid supply system 34 may supply the fluid to the fluid distribution system 32 via the fluid supply line 40. In some embodiments, the fluid supply line 40 may direct the fluid flow to only one of the spray rings 56. The other spray rings 56 that may not be directly supplied by the fluid supply line 40 from the fluid supply system 34, but may be indirectly supplied through another spray ring 56 that is directly coupled to the fluid supply line 40. However, in some embodiments, the fluid supply line may direct the fluid flow to each spray ring 56 individually through branch fluid supply lines 88. The fluid supply line 40 may branch into the branch fluid supply lines 88, as in the illustrated embodiment, and the branch fluid supply lines 88 may direct the flow of fluid to the respective spray rings 56. The fluid distribution system 32 may utilize one or more valves 90 to control the flow of the spray fluid to the spray rings 56. In some embodiments, there may be multiple fluid supply lines 40 that may each individually direct the fluid flow from the fluid supply system 34 to the respective spray rings 56. In embodiments where the spray rings 56 are each supplied by a fluid supply line 40 or a branch fluid supply line 88, the different nozzle types (e.g., the wet compression nozzles 80 and the water wash nozzles 82) of a spray ring 56 may each be supplied through a separate conduit within the spray ring 56, as discussed in greater detail with reference to FIG. 5. Further, in some embodiments, each type of nozzle grid (e.g., wet compression nozzle grid, water wash nozzle grid) may be separately supplied by a respective fluid supply line 40. In this manner, the spray rings 56 may be utilized selectively to control different levels of wet compression or water wash. For example, one, two, or three spray rings 56 may be utilized for wet compression or for water wash to inject the spray fluid into the intake air flow 18, as discussed in greater detail with respect to FIG. 5.

The spray rings 56 of the fluid distribution system 32 may be continuous rings, or in some embodiments, the spray rings 56 may be split into sections, either individually or as a group. For example, in the illustrated embodiment, the spray rings 56 may be split into equal sections 84 at an angle 86. Only one section 84 is shown in the illustrated embodiment for clarity purposes. The angle 86 may be any angle (e.g., 45°, 90°, 120°, 180°) that may create equal circumferential sections of the spray rings 56. The sections 84 may include portions of one or more spray rings 56. In some embodiments, if the sections 84 include portions of each of the spray rings 56, the portion of each of the spray rings 56 in the respective sections 84 may be coupled together by supports, as discussed in greater detail with reference to FIG. 4. Further, in some embodiments, the sections 84 may each have their own respective fluid supply line 40 or branch fluid supply line 88 to direct the fluid from the fluid supply system 34 to the respective sections 84. The sections 84, may enable more efficient installation, repair, or injection of the spray fluid into the intake air flow 18.

Figure 4:
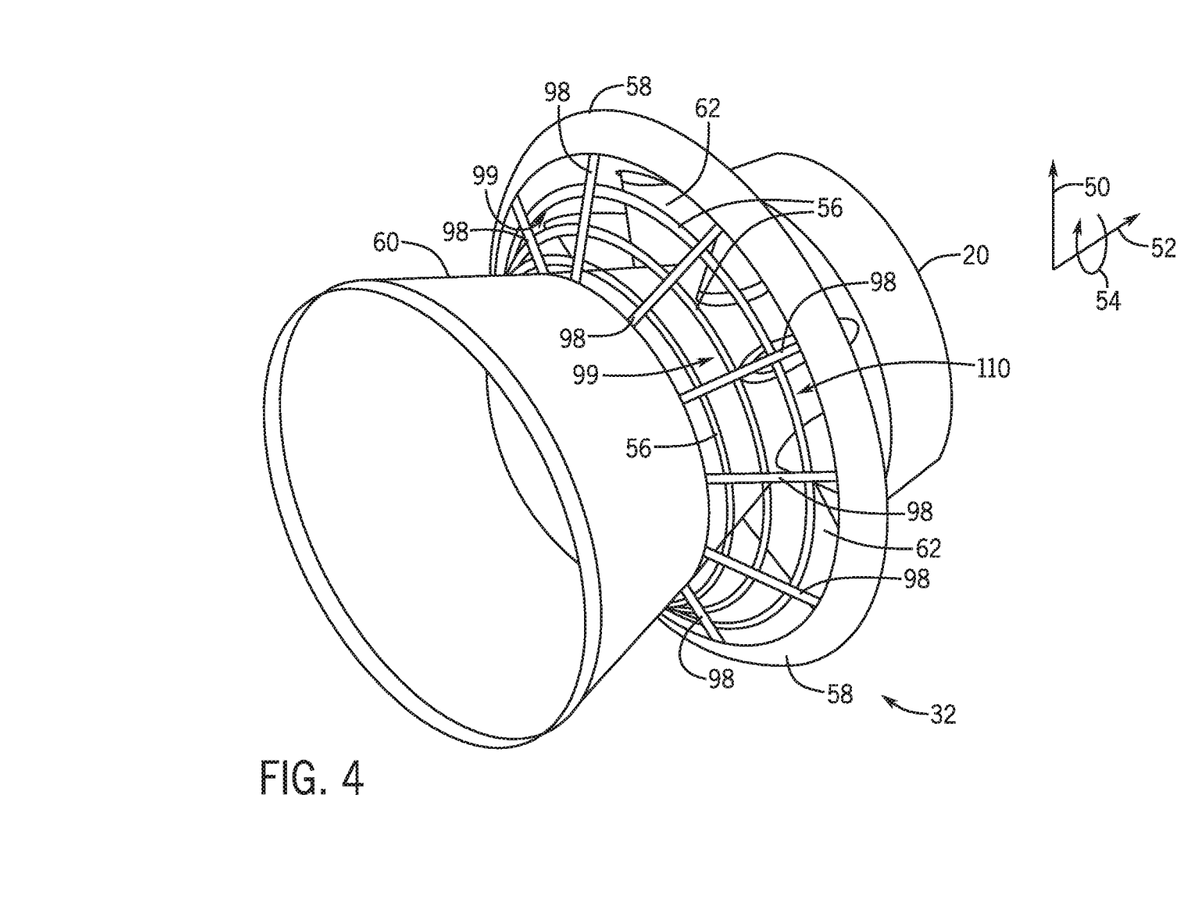
FIG. 4 is a perspective view of an embodiment of the fluid distribution system of FIG. 1, in accordance with an embodiment of the present disclosure.

FIG. 4 is a perspective view of an embodiment of the fluid distribution system 32 showing the multiple spray rings 56 circumferentially 54 disposed about the shroud 60 and positioned upstream of the inlet 57 to the compressor 20. In some embodiments, the fluid distribution system 32 may include structural supports 98 that may be configured to secure the spray rings 56 in position. There may be any quantity (e.g., 1, 2, 3, 4, 5, 6, 7, or more) of the structural supports 98 around the axis 52. The structural supports 98 may couple the spray rings 56 to each other, to the bell mouth 58 at the inlet to the compressor 20, and to the shroud 60. In some embodiments, the structural supports 98 are connected to the upstream edge 99 of the spray rings 56. In some embodiments, the structural supports 98 are connected to the trailing edge 110 of the spray rings 56. In the illustrated embodiment, the structural supports 98 are shown connecting the three spray rings 56 to each other, as well as connecting the spray rings 56 to the bell mouth 58 and to the shroud 60. However, in some embodiments, the structural supports 98 may connect one or more of the spray rings 56 to only the bell mouth 58 or to only the shroud 60. That is, the structural supports 98 may extend in the radial direction 50 from the bell mouth 58 or from the shroud 60. The structural supports 98 may also connect the spray rings 56 to any other structure or casing that may secure the spray rings 56 in position, such as the walls of the air intake 28. In some embodiments, the structural supports 98 may connect the spray rings 56 of the each section 84 together. Further, the structural supports 98 may connect each section 84 to the bell mouth 58, the shroud 60, both, or any other structure or casing.

In some embodiments, one or more of the fluid supply lines 40 and the branch fluid supply lines 88 may couple to the spray rings 56 by running along the structural supports 98. The fluid supply lines 40 and the branch fluid supply lines 88 from the fluid supply system 34 may extend from inside the shroud 60 or from outside of the compressor 20 at the bell mouth 58. In some embodiments, one or more of the fluid supply lines 40 or the branch fluid supply lines 88 may be positioned on or within the structural supports 98 to reach the spray rings 56. These configurations may enable the supply of fluid to the spray rings 56 while reducing the obstruction of the flow of the intake air flow 18 or the spray fluid injected into the intake air flow 18.

Figure 5:
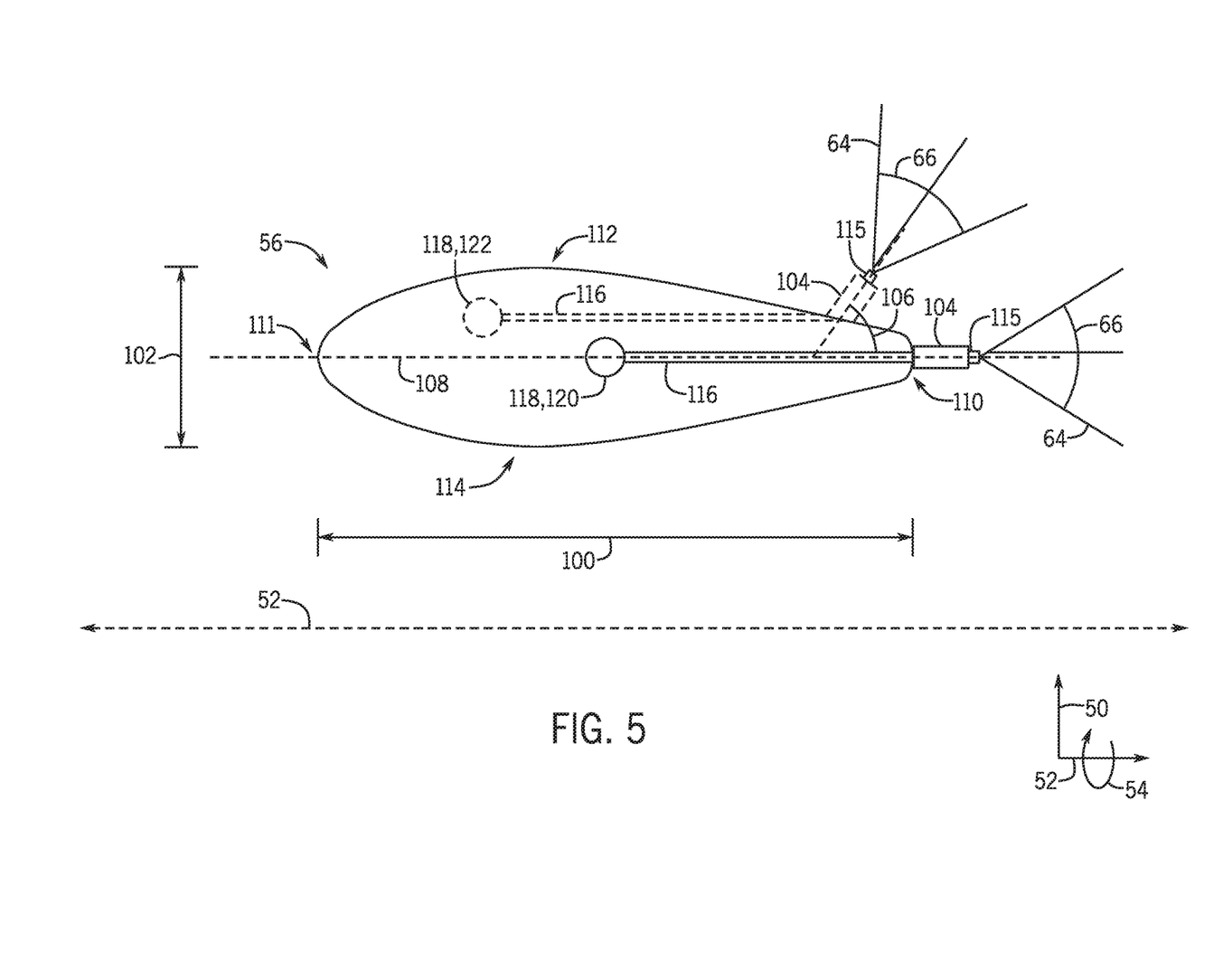
FIG. 5 is a cross-sectional view of an embodiment of a spray ring of the fluid distribution system of FIG. 1, in accordance with an embodiment of the present disclosure.

FIG. 5 is a cross-sectional view of an embodiment of a spray ring 56 of the fluid distribution system 32. The shape of the cross section of the spray rings 56 may be airfoil-shaped or any other shape configured to reduce drag or pressure loss on the intake air flow 18, such as oval shaped. In some embodiments, each of the multiple spray rings 56 may be the same cross-sectional shape. However, the spray rings 56 may have different cross-sectional shapes. In some embodiments, the spray ring 56 may have an axial length 100 of 127 millimeters (e.g., 5 inches) and a radial height 102 of 38.1 millimeters (e.g., 1.5 inches). However, in some embodiments, the axial length 100 of the spray ring 56 may be another length (e.g., 4, 6, 7, 8, or more inches), and the radial height 102 of the spray ring 56 may be another length (e.g., 1, 2, 3, 4, or more inches). In some embodiments, all of the spray rings 56 of the fluid distribution system 32 may have the same axial length 100 and the same radial height 102. However, in some embodiments, the spray rings 56 may have different axial lengths 100 and different radial heights 102.

Each spray ring 56 may have a plurality of nozzles 104. The nozzles 104 may be the wet compression nozzles 80 or the water wash nozzles 82. In some embodiments, each nozzle 104 may be disposed on or adjacent to a trailing edge 110 of the spray ring 56, where the trailing edge 110 of the spray ring 56 is the edge pointing downstream towards the compressor 20. However, in some embodiments, the nozzles 104 may be positioned adjacent to the trailing edge 110 of the spray ring 56. For example, the nozzles 104 may be positioned nearer to the trailing edge 110 of the spray ring 56 than to a leading edge 111. The nozzles 104 may be disposed on a radially outer surface 112 of the spray ring 56 and a radially inner surface 114 of the spray ring 56. In some embodiments, each nozzle 104 may be positioned at an angle 106 from a center axis 108 of the spray ring 56. In the illustrated embodiment, the center axis 108 of each spray ring 56 is parallel to the axis 52 of the compressor 20. However, in some embodiments, the center axis 108 of each spray ring 56 may be oriented toward the axis 52 of the compressor 20. The angle 106 may be any angle (e.g., 90°, 45°) configured to inject the fluid into the intake air flow 18 as it passes into the compressor 20. Further, some of the nozzles 104 may be disposed along the center axis 108 such that the nozzles 104 point directly downstream from the trailing edge 110 of the spray ring 56. The nozzles 104 may be mounted on the surface of the spray rings 56, or the nozzles 104 may be disposed fully within the structure of the spray rings 56 such that the nozzles 104 do not protrude from the surface of the spray rings 56. Nozzles 104 disposed within the structure of the spray rings 56 may help reduce obstruction of the fluid spray.

Each nozzle 104 may have an outlet 115 for the supplied fluid to exit the spray rings 56. The outlets of the wet compression nozzles 80 may be smaller than the outlets of the water wash nozzles 82, thus enabling smaller fluid droplet sizes from the wet compression nozzles 80 compared to water wash nozzles 82. Different fluid droplet sizes may be utilized for different processes within the compressor 20, such as wet compression or online water wash. Further, because the outlet sizes of wet compression nozzles 80 and the water wash nozzles 82 may be different, the fluid pressure at each type of nozzle 104 may vary. As previously discussed, each nozzle 104 may produce a fluid spray 64 that may be sprayed towards the inlet 57 of the compressor 20. In some embodiments, the spray 64 from each nozzle may have a width 66 that may be varied. The width 66 of the spray 64 may be varied based at least in part on the type of nozzle, the pressure of the fluid supplied to the nozzle, the flow rate of the fluid supplied to the nozzle, or any combination thereof. The width 66 of the spray 64 may vary between water wash nozzles, wet compression nozzles, and a mixture of both types of nozzles.

As previously discussed, each spray ring 56 may have any quantity (e.g., 1, 2, 3, 4, 5, 6, 7, 8, 9, 10, or more) of the nozzles 104. Further, the nozzles 104 of each spray ring 56 may be all wet compression nozzles 80, all water wash nozzles 82, or a mix of both wet compression nozzles 80 and water wash nozzles 82. In some embodiments, the spray ring 56 may have all one type of the nozzles 104. Each of the single type of nozzles 104 may all be disposed on the radially outer surface 112, the radially inner surface 114, or the trailing edge 110. However, the single type of nozzles 104 may be disposed on two or more of the surfaces of the spray ring 56. Further, the single type of nozzles 104 may all be positioned at the same angle 106 from the center axis 108 of the spray ring 56, or they may be positioned at different angles 106. In some embodiments, with spray rings 56 that may have both types of nozzles 104, the each of the wet compression nozzles 80 may be disposed along the same surface (e.g., radially outer surface 112, radially inner surface 114, or trailing edge 110) or along different surfaces. Further, each of the wet compression nozzles 80 may be positioned at the same angle 106 from the center axis 108 of the spray ring 56, or they may be positioned at different angles 106. For example, in some embodiments, each wet compression nozzle 80 may be disposed on the radially outer surface 112 and positioned at an angle 106 of 45° from the center axis 108. In some embodiments, the wet compression nozzles 80 may be disposed on the radially outer surface 112 and on the radially inner surface 114 and a portion of the wet compression nozzles 80 may be positioned at an angle 106 of 45° from the center axis 108 and another portion of the wet compression nozzles 80 may be positioned at an angle 106 of 90°. Similarly, the water wash nozzles 82 may all be positioned along the same surface (e.g., radially outer surface 112, radially inner surface 114, or trailing edge 110) or along different surfaces. Further, the water wash nozzles 82 may all be positioned at the same angle 106 from the center axis 108 of the spray ring 56, or they may be positioned at different angles 106. For example, in some embodiments, each water wash nozzle 82 may be disposed on the radially outer surface 112 and positioned at an angle 106 of 45° from the center axis 108. In some embodiments, the water wash nozzles 82 may be disposed on the radially outer surface 112 and on the radially inner surface 114 and a portion of the water wash nozzles 82 may be positioned at an angle 106 of 45° from the center axis 108 and another portion of some of the water wash nozzles 82 may be positioned at an angle 106 of 90°. The varying arrangements of the nozzles 104 on each spray ring 56 may help reduce thermal gradients in the radial direction 50 within the compressor 20 until the fluid droplets evaporate during wet compression processes and may help enable an increase in the area of the compressor blades 68 that may be cleaned during water wash procedures.

The nozzles 104 may be supplied with the fluid from the fluid supply system 34 through nozzle fluid lines 116. The nozzle fluid lines 116 may direct the fluid from fluid conduits 118 to the nozzles 104 within the spray ring 56. There may be one or more fluid conduits 118 within the spray ring 56 that may supply the fluid to the nozzles 104 via the nozzle fluid lines 116. The one or more fluid conduits 118 may receive the fluid from the fluid supply lines 40 or the branch fluid supply lines 88. The one or more fluid conduits 118 may extend circumferentially throughout the spray ring 56 or sections 84 of the spray ring 56 to supply spray fluid to the nozzles 104 of the spray ring 56. In some embodiments, the fluid conduit 118 may supply all of the nozzles 104 of the spray ring 56, including both wet compression nozzles 80 and water wash nozzles 82. However, in some embodiments, a first fluid conduit 120 may supply only the nozzles 104 that are wet compression nozzles 80, and a second fluid conduit 122 may supply only the nozzles 104 that are water wash nozzles 82. Therefore, in some embodiments, there may be more than one fluid conduit 118 within the spray ring 56, and each fluid conduit 118 may supply the nozzles 104 of the spray ring 56 that are of a particular type. For example, the first fluid conduit 120 may supply the wet compression nozzles 80 of the spray ring 56 with the spray fluid at a first pressure, and the separate second fluid conduit 122 may supply the water wash nozzles 82 of the spray ring 56 with the spray fluid at a second pressure that is different than the first pressure. Additionally or in the alternative, the one or more fluid conduits 118 may each supply a respective section 84 of the spray ring, including all of the nozzles 104 of that respective section 84 or all the nozzles 104 of a particular type of that respective section 84 of the spray ring 56. Further, the configuration of the one or more fluid conduits 118 may be the same or different within each of the multiple spray rings 56 of the fluid distribution system 32. The nozzles 104 about the spray rings 56 may be arranged in a uniform distribution about the axis 52 and the inlet 57 of the compressor 20. This distribution of the nozzles 104 about the axis 52 may enable a more even distribution of the droplets of the spray fluid in the radial direction 50 and in the circumferential direction 54 within the compressor 20. Further, the fluid distribution system 32 may have different usage settings for the wet compression mode and the water wash mode. For example, a low setting may use one spray ring 56, an intermediate setting may use two of the spray rings 56, and a high setting may use three spray rings 56. Additionally, each spray ring 56 may have a different flow rate of the fluid from the fluid supply system 34. Therefore, in embodiments with low, medium, and high usage settings, the fluid distribution system 32 may have up to seven possible flow rates if each of the three spray rings 56 have different flow rates.

Technical effects of the disclosed embodiments include a disposed fluid distribution system disposed circumferentially about a compressor axis that may provide a fluid upstream of the inlet of the compressor of a gas turbine system for processes in the compressor, such as wet compression and online water wash. The spray rings of the fluid distribution system may be axially staggered upstream of the inlet of the compressor. Additionally, the spray rings may be disposed at different radial positions, which may reduce an obstruction of an intake air flow across the spray rings into the compressor. In some embodiments, the spray rings may include multiple nozzles disposed circumferentially around the axis of the compressor, which may enable a circumferential distribution of the fluid. The circumferential and radial distribution of the spray fluid near the inlet of the compressor may reduce the thermal gradients in the circumferential and radial directions within the compressor as the fluid droplets evaporate and migrate during wet compression processes. The radial positioning of the spray nozzles at the inlet may take into account the migration of the droplets due to centrifugal forces within the compressor with the aim of reducing temperature distortion within the compressor. Further, the circumferential and radial distribution of the fluid near the inlet of the compressor may enable an increase in the area of the compressor blades that may be cleaned during water wash procedures. In turn, a reduction of thermal gradients within the compressor or an increase in the area of compressor blades that may be cleaned may enable an increase in the efficiency and the output of the gas turbine system. Further, the spray rings may be formed from multiple sections of individual rings or sections of the group of spray rings together, which may enable more efficient installation or repair of the fluid distribution system. In some embodiments the spray rings of the fluid distribution system may include nozzles for both wet compression and water wash, thus enabling the fluid distribution system to be utilized for multiple processes within the compressor and may enable a cost saving benefit. Similarly, the circumferentially disposed axially staggered spray rings of the fluid distribution system may enable uniform distribution of the fluid droplets at the inlet of the compressor, which may enable other mechanisms, such as a fogger or an evaporative cooler, to be eliminated from the air intake system of the compressor.

This written description uses examples to disclose the concepts discussed herein, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
   a fluid distribution system, comprising:
      a plurality of spray rings configured to be disposed upstream of an inlet of a compressor in a space radially between an inner surface of a bellmouth and an outer surface of a shroud and axially overlapping the shroud, wherein the plurality of spray rings comprises:
         a first spray ring disposed about an axis of the compressor, wherein a first plurality of nozzles is coupled to the first spray ring about the axis in the space, and wherein the first plurality of nozzles is configured to spray a first fluid flow toward the inlet of the compressor; and
         a second spray ring disposed about the axis of the compressor, wherein a second plurality of nozzles is coupled to the second spray ring about the axis in the space, and wherein the second plurality of nozzles is configured to spray a second fluid flow toward the inlet of the compressor.

2. The system of claim 1, wherein the first spray ring is disposed at a first radial distance from the axis and a first axial position along the axis, the second spray ring is disposed at a second radial distance from the axis and a second axial position along the axis, the second radial distance is greater than the first radial distance, and the second axial position is axially offset in a downstream direction of a compressor flow through the compressor relative to the first axial position.

3. The system of claim 2, comprising a third spray ring disposed at a third radial distance from the axis and a third axial position along the axis, wherein the third radial distance is greater than the second radial distance, and the third axial position is axially offset in the downstream direction of the compressor flow through the compressor relative to the second axial position.

4. The system of claim 1, wherein the first plurality of nozzles comprises a first plurality of wet compression nozzles and a first plurality of water wash nozzles, wherein the first plurality of wet compression nozzles and the first plurality of water wash nozzles are structurally different from one another such that the first plurality of wet compression nozzles is configured to output droplets of different sizes than the first plurality of water wash nozzles.

5. The system of claim 4, wherein the first plurality of wet compression nozzles of the first spray ring are configured to spray the first fluid flow toward the inlet with a non-uniform distribution between an inner diameter of the compressor and an outer diameter of the compressor, wherein the non-uniform distribution comprises a greater distribution of the first fluid flow toward the inner diameter than the outer diameter.

6. The system of claim 4, wherein the second plurality of nozzles comprises a second plurality of wet compression nozzles and a second plurality of water wash nozzles, wherein the second plurality of wet compression nozzles and the second plurality of water wash nozzles are structurally different from one another such that the second plurality of wet compression nozzles is configured to output droplets of different sizes than the second plurality of water wash nozzles.

7. The system of claim 4, wherein outlets of the first plurality of wet compression nozzles are smaller than outlets of the first plurality of water wash nozzles, and the first plurality of wet compression nozzles are separate from the first plurality of water wash nozzles.

8. The system of claim 4, wherein the first plurality of wet compression nozzles is spaced circumferentially about the axis of the compressor, the first plurality of water wash nozzles is spaced circumferentially about the axis of the compressor, and at least some of the first plurality of wet compression nozzles and the first plurality of water wash nozzles are circumferentially staggered relative to one another.

9. The system of claim 1, wherein the first spray ring is split into a plurality of first sections, and each first section of the plurality of first sections is coupled to a respective first fluid supply line configured to supply the first fluid flow, wherein the second spray ring is split into a plurality of second sections, and each second section of the plurality of second sections is coupled to a respective second fluid supply line configured to supply the second fluid flow.

10. The system of claim 1, wherein the first plurality of nozzles is disposed on a first trailing edge of the first spray ring of the plurality of spray rings, and the first trailing edge is nearer to the inlet of the compressor than a first leading edge of the first spray ring, wherein the second plurality of nozzles is disposed on a second trailing edge of the second spray ring of the plurality of spray rings, and the second trailing edge is nearer to the inlet of the compressor than a second leading edge of the second spray ring.

11. The system of claim 1, further comprising:
   a plurality of struts extending between the inner surface of the bellmouth and the outer surface of the shroud; and
   a plurality of supports extending between the inner surface of the bellmouth and the outer surface of the shroud, wherein the plurality of spray rings are directly coupled to the plurality of supports.

12. The system of claim 1, wherein each of the plurality of spray rings has an airfoil shaped cross-section, wherein the first plurality of nozzles comprise a first nozzle at a first angle and a second nozzle at a second angle, and the first and second angles are different from one another.

13. A system comprising:
   a fluid distribution system, comprising:

a plurality of spray rings configured to be disposed upstream of an inlet of a compressor in a compressor intake flow path between an inner surface of a bellmouth and an outer surface of a shroud, wherein the plurality of spray rings comprises:
- a first spray ring configured to be disposed about an axis of the compressor in the compressor intake flow path, wherein a first plurality of nozzles is coupled to the first spray ring to spray a first fluid flow into the compressor intake flow path;
- a second spray ring configured to be disposed about the axis of the compressor in the compressor intake flow path, wherein a second plurality of nozzles is coupled to the second spray ring to spray a second fluid flow into the compressor intake flow path; and a plurality of supports configured to mount in the compressor intake flow path separate from a plurality of struts in the compressor intake flow path, wherein the plurality of supports is configured to extend between the inner surface of the bellmouth and the outer surface of the shroud, wherein the plurality of spray rings is supported by the plurality of supports.

14. The system of claim 13, comprising the compressor having the plurality of spray rings, the plurality of supports, and the plurality of struts in the compressor intake flow path.

15. The system of claim 13, wherein the first or second plurality of spray nozzles comprises a plurality of water wash nozzles, wherein the first or second plurality of spray nozzles comprises a plurality of wet compression nozzles, wherein the plurality of water wash nozzles and the plurality of wet compression nozzles are separate and structurally different from one another.

16. The system of claim 13, wherein the plurality of spray rings comprises a third spray ring configured to be disposed about the axis of the compressor in the compressor intake flow path, wherein a third plurality of nozzles is coupled to the third spray ring to spray a third fluid flow into the compressor intake flow path.

17. The system of claim 13, wherein the first and second spray rings are configured to be disposed in the compressor intake flow path radially between the inner surface of the bellmouth and the outer surface of the shroud and axially overlapping the shroud.

18. A system comprising:
a fluid distribution system, comprising:
a plurality of spray rings configured to be disposed in a compressor intake flow path of a compressor, wherein the plurality of spray rings comprises:
a first spray ring configured to be disposed about an axis of the compressor in the compressor intake flow path, wherein the first spray ring is disposed at a first radial distance from the axis and a first axial position along the axis;
a second spray ring configured to be disposed about the axis of the compressor in the compressor intake flow path, wherein the second spray ring is disposed at a second radial distance from the axis and a second axial position along the axis, the second radial distance is greater than the first radial distance, and the second axial position is axially offset in a downstream direction of a compressor flow through the compressor relative to the first axial position; and
a third spray ring configured to be disposed about the axis of the compressor in the compressor intake flow path, wherein the third spray ring is disposed at a third radial distance from the axis and a third axial position along the axis, the third radial distance is greater than the second radial distance, and the third axial position is axially offset in the downstream direction of the compressor flow through the compressor relative to the second axial position.

19. The system of claim 18, comprising the compressor having the plurality of spray rings in the compressor intake flow path.

20. The system of claim 19, comprising a gas turbine engine having the compressor.

21. The system of claim 18, wherein a first plurality of nozzles is coupled to the first spray ring, a second plurality of nozzles is coupled to the second spray ring, and a third plurality of nozzles is coupled to the third spray ring.

* * * * *